(12) United States Patent
Suzuki

(10) Patent No.: US 6,864,903 B2
(45) Date of Patent: Mar. 8, 2005

(54) INTERNET SYSTEM FOR VIRTUAL TELEPRESENCE

(75) Inventor: Norihisa Suzuki, Los Altos Hills, CA (US)

(73) Assignee: Zaxel Systems, Inc., Los Altos, CA (US)

( * ) Notice: Subject to any disclaimer, the term of this patent is extended or adjusted under 35 U.S.C. 154(b) by 201 days.

(21) Appl. No.: 10/388,836

(22) Filed: Mar. 14, 2003

(65) Prior Publication Data

US 2003/0231179 A1 Dec. 18, 2003

Related U.S. Application Data

(63) Continuation-in-part of application No. 09/708,293, filed on Nov. 7, 2000, now Pat. No. 6,573,912.

(51) Int. Cl.[7] .............................................. G06T 17/00
(52) U.S. Cl. .................... 345/757; 345/419; 345/420; 345/422
(58) Field of Search ................................ 345/419, 420, 345/422; 382/757, 154

(56) References Cited

U.S. PATENT DOCUMENTS 5,745,126 A * 4/1998 Jain et al. ................... 382/154

* cited by examiner

*Primary Examiner*—Almis Jankus
(74) *Attorney, Agent, or Firm*—Michael A. Glenn; Glenn Patent Group

(57) ABSTRACT

The present invention is an interactive virtual telepresence system that allows an Internet user to view three-dimensional objects from any perspective in a studio at a remote server. The system includes several video cameras trained on the three-dimensional objects and a computer that calculates the depth information of the solid. The server broadcasts each camera view and depth information for each view. A user selects the viewing perspective desired, and the computer at the user's site receives the nearest camera views to the requested perspective and depth information of each of the views for the interpolation and renders the selected view. The invention also applies to virtual viewpoints where a virtual three-dimensional model image is stored on a network server. The server uses virtual cameras that obtain a rendered image and depth information for a particular viewpoint and sends the rendered image and the depth information to a user.

20 Claims, 8 Drawing Sheets

INTERNET SYSTEM FOR VIRTUAL TELEPRESENCE

CROSS REFERENCE TO RELATED APPLICATIONS

This application is a Continuation-in-part of U.S. patent application Ser. No. 09/708,293, filed on 7, Nov. 2000 now U.S. Pat. No. 6,573,912.

BACKGROUND OF THE INVENTION

1. Technical Field

The present invention relates to the efficient representation and communication of synthesized perspective views of three-dimensional objects, and more specifically to paring down the number of Internet packets that must be sent in real-time at a network client's request to support interactive video sessions.

2. Description of the Prior Art

The limited bandwidth of Internet connections severely constrains the interactive real-time communication of graphical images, especially three-dimensional images. Ordinarily, dozens of video cameras would be trained on a single three-dimensional subject, each from a different perspective. A user could then pick one of the perspectives to view, or pick one that can be interpolated from several of the nearby perspectives. But sending all this information in parallel and computing all the interpolations that many users could request can overtax the server and its Internet pipe.

It is possible to represent solid objects with so-called "voxels". These are the three-dimensional equivalents of pixels which are used to paint two-dimensional pictures. Each voxel has an x,y,z address in space, and a value that indicates whether the point is inside or outside the solid. The voxel map can be computed from the video images provided by a sufficient number of perspectives. The surface appearance of the solid can also be captured by each such camera. Interpolated intermediate images can be had by warping or morphing.

U.S. Pat. No. 5,613,048, issued to Chen and Williams, describes a first approach for interpolating solid structures. An offset map is developed between two neighboring images from correspondence maps. Such Patent is incorporated herein by reference.

A second approach uses the structural information about an object. Voxel information is derived from the video images provided by several cameras. Depth maps can be calculated for each camera's viewpoint, and is obtained from correspondences between surface points, e.g., triangulation. Another technique involves using silhouettes in intersections. Once the voxels for a solid are determined, intermediate (virtual) views can be obtained from neighboring (real) views.

Prior art methods for the three-dimension reconstruction of remote environments consume enormous computational and communication resources, and require far too many sensors to be economically feasible. So real-time applications are practically impossible with conventional techniques for modeling and rendering object appearance.

Recent advances at the "Virtualized Reality" laboratory at Carnegie Mellon University (CMU) demonstrate that real-time three-dimension shape reconstruction is possible. Video-based view generation algorithms can produce high-quality results, albeit with small geometric errors.

Research in three-dimension reconstruction of remote environments has shown that it is possible to recover both object appearance and sounds in remote environments. The methods for modeling object appearance, however, consume enormous computational and communication resources, and require far too many sensors to be economically feasible. These traits make real-time applications nearly impossible without fundamental algorithmic improvements. We therefore focus our attention on techniques for modeling and rendering object appearance, which can loosely be divided into three groups: direct three-dimension, image-space, and video-based.

Direct methods of three-dimension reconstruction measure the time-of-flight or phase variations in active illumination reflected from the scene. These measurements are converted directly into measurements of three-dimension distances. Because of their reliance on active illumination, multiple sensors can not co-exist in the same environment. As a result, they are inappropriate for real-time three-dimension reconstruction of complete environments.

Image-space methods create a database of all possible rays emanating from every object that point in all directions. To generate a new image, all the rays that pass through the desired viewpoint are projected on a plane. See, A. Katayama, K. Tanaka, T. Oshino, and H. Tamura, "A Viewpoint Dependent Stereoscopic Display Using Interpolation Of Multi-viewpoint Images", SPIE Proc. Vol. 2409: Stereoscopic Displays and Virtual Reality Systems II, p. 11–20, 1995. And see, M. Levoy and P. Hanrahan, "Light Field Rendering", SIGGRAPH '96, August 1996. Also, S. J. Gortler, R. Grzeszczuk, R. Szeliski, and M. F. Cohen, "The Lumigraph", SIGGRAPH '96, 1996. Such references are all examples of image-space methods, and all can produce high-quality images. However, these techniques require thousands of viewpoints, making them impractical for real-time event capture.

Video-based modeling and rendering methods explicitly create three-dimension model structures and use real video images as models of scene appearance. A three-dimension model structure is extracted from a set of video images. New views are generated by projecting the original video images onto a three-dimension model, which can then be projected into the desired viewpoint.

Images from two viewpoints can be used to estimate the three-dimension structure in image-based stereo reconstruction. Given the positions, orientations, and focal lengths of the cameras, correspondences are used to triangulate the three-dimension position of each point of the observed surface. The output is called a depth image or range image. Each pixel is described with a distance, e.g., rather than color. A recent survey of stereo algorithms is given by U. R. Dhond and J. K. Aggarwal, in "Structure From Stereo—A Review", IEEE Trans. On Pattern Analysis and Machine Intelligence, pp. 1489–1510, 1989. While stereo methods can provide three-dimension structure estimates, they are so-far unable to produce high-quality, high-accuracy results on a consistent basis across a reasonable variation in scene content.

The recovery of complete three-dimension models of a scene required multiple range images. This is because a single range image includes a three-dimension structure only for the visible surfaces. At the "Virtualized Reality" laboratory at Carnegie Mellon University, the present inventor, Takeo Kanade has shown that formulating this problem as a volumetric reconstruction process yields high-quality, robust solutions even in the presence of the errors made in the stereo processes. See, P. W. Rander, P. J. Narayanan, and T. Kanade, "Recovery of Dynamic Scene Structure from Multiple Image Sequences", Int'l Conf. On Multisensor Fusion and Integration for Intelligent Systems, 1996.

The volume containing the objects can be decomposed into small samples, e.g., voxels. Each voxel is then evaluated to determine whether it lies inside or outside the object. When neighboring voxels have different status (i.e., one inside and one outside), then the object surface must pass between them. Such property is used to extract the object surface, usually as a triangle mesh model, once all voxels have been evaluated. The technique is similar to integration techniques used with direct three-dimension measurement techniques with some modifications to improve its robustness to errors in the stereo-computed range images. See, Curless and M. Levoy, "A Volumetric Method for Building Complex Models from Range Images", SIGGRAPH '96, 1996. And see, A. Hilton, A. J. Stoddart, J. Illingworth, and T.Windeatt, "Reliable Surface Reconstruction From Multiple Range Images", Proceedings of ECCV '96, pp. 117–126, April 1996. Also, M. Wheeler, "Automatic Modeling and Localization for Object Recognition", Ph.D. thesis, Carnegie Mellon University, 1996.

A principle limitation of these methods is the processing speed. For example, CMU clustered seventeen Intel Pentium II-based PC's and inter-connected them with a 10-base-T ETHERNET network, and still needed more than 1000 seconds to process each second of video input.

Once a three-dimension structure is available, two methods can be used to generate arbitrary viewpoints. One method computes the "fundamental" appearance of the objects in the scene, independent of viewpoint. The result is a texture map for the three-dimension objects in the scene. This formulation maps well to modern hardware graphics accelerators because the core rendering primitive is a texture-mapped triangle. CMU and others have used this technique. See, A. Katkere, S. Moezzi, D. Y. Kuramura, and R. Jam, "Towards Video-based Immersive Environments", MultiMedia Systems, vol. 5, no. 2, pp. 69–85, 1997; S. Moezzi, A. Katkere, D. Y. Kuramura, and R. Jam, "Reality Modeling and Visualization from Multiple Video Sequences", IEEE Computer Graphics and Applications, vol. 16, no. 6, pp. 58–63, 1996; P. J. Narayanan, P. W. Rander, and T. Kanade, "Constructing Virtual Worlds Using Dense Stereo", IEEE Int'l Conf. On Computer Vision, 1998; and, P. W. Rander, P. J. Narayanan, and T. Kanade, "Virtualized Reality: Constructing Time-Varying Virtual Worlds from Real World Events", IEEE Visualization '97, 1997.

A second method skips the step of texture map creation. Instead, it maps the input images directly to the output image. Skipping the texture map creation helps avoid the quality degradations that might occur because of extra pixel transformations and any geometric errors in the three-dimension model. The three-dimension information is used to determine how each input pixel should map to the output, either a full three-dimension model or range images. The input images are essentially projected onto a three-dimension scene structure, so the structure can be projected into the desired output image, all in a single operation.

It is possible to individually weigh the contributions to the output image because each input image can be mapped separately to the output. For example, as the desired viewpoint approaches a real viewpoint, the weighting can emphasize the contribution of that real view while de-emphasizing the other real views. This technique has been explored by the present inventor, Takeo Kanade, and others. See, Chen and L. Williams, "View Interpolation For Image Synthesis", SIGGRAPH '93, pp. 279–288, 1993. And see, B. Curless and M. Levoy, "A Volumetric Method For Building Complex Models From Range Images", SIGGRAPH '96, 1996. Also, T. Kanade, P. J. Narayanan, and P. W. Rander, "Virtualized Reality: Concept And Early Results", IEEE Workshop on the Representation of Visual Scenes, June 1995. And, P. W. Rander, P. J. Narayanan, and T. Kanade, "Virtualized Reality: Constructing Time-Varying Virtual Worlds From Real World Events", IEEE Visualization '97, 1997; S. M. Seitz and C. R. Dyer, "Physically-Valid View Synthesis By Image Interpolation", Proc. Workshop on Representation of Visual Scenes, pp. 18–25, 1995; and, S. M. Seitz and C. R. Dyer, "View Morphing", SIGGRAPH '96, pp. 21–30, 1996.

Image-based methods are such that the view generation time is independent of scene complexity, so the rendering of purely virtual three-dimension content on low-end PCs can be speeded up. When a desired viewpoint exactly matches an input viewpoint, the output image is exactly the input image. As a result, the output contains no error, regardless of any error in the underlying three-dimension structure. Recent analysis at the "Virtualized Reality" laboratory at CMU has shown that the most critical three-dimension information that is needed is the boundaries between regions of the images. Especially those regions that correspond to surfaces at greatly different depths. See, H. Saito, S. Baba, M. Kimura, S. Vedula, and T. Kanade, "Appearance-Based Virtual View Generation Of Temporally-Varying Events From Multi-Camera Images In The Three-dimension Room", Three-dimension Digital Imaging and Modeling (3D1M'99), October 1999. (Also CMU-CS-99-127).

Such boundaries, often called silhouettes or occluding contours, provide powerful visual cues to human observers. Methods that do not accurately describe such boundaries cause glaring errors that are easy to spot. In such cases, any realism of the virtual image vanishes. See, H. Saito, S. Baba, M. Kimura, S. Vedula, and T. Kanade, "Appearance-Based Virtual View Generation Of Temporally-Varying Events From Multi-Camera Images In The Three-dimension Room", Three-dimension Digital Imaging and Modeling (3D1M'99), October 1999. Also, CMU-CS-99-127. In contrast, humans rarely detect inaccuracies of surface geometry because the human visual system is much less sensitive to this type of error.

Recent analysis has shown that identification of occluding contours is far more important than precise estimation of smooth surface structure. With this insight, recent efforts at CMU have focussed on recovering the three-dimension scene structure from the object silhouettes themselves. This process begins by extracting object silhouettes from the input images. These silhouettes are directly integrated in three-dimension to recover a three-dimension model of scene structure.

This process bears close resemblance to the earlier CMU work of using stereo to compute dense range images and then using integration to get a three-dimension model. In method embodiments of the present invention, a reconstruction process estimates correspondences only at silhouette boundaries. The correspondence estimation occurs directly in a volume, rather than using the intermediate representation of a range image. In method embodiments of the present invention computational cost is greatly reduced, and generated views are more realistic.

Useful three-dimension structures can be obtained without large computational expense. The video-based rendering techniques developed at CMU provide high-quality renderings that are immune to small geometric errors on continuous surfaces. These methods can be combined to create an interactive remote collaboration system. Reconstruction from several cameras at one end generates multiple video streams and a three-dimension model sequence. This information is then used to generate the novel viewpoints using video-based rendering techniques.

In constructing the system several factors influence the overall design, number of sites participating, number of people at each site, balance among computational resources, communication bandwidth, and communication latency.

For a two-site, one-person-per-site communication with relatively short communication latencies, it is possible to construct the three-dimension shape more efficiently than for a general number of viewers, because knowledge about the remote viewer location can guide the reconstruction process. Similarly, knowing the remote viewer location can be exploited to reduce communication bandwidth and to speedup the rendering process.

To further reduce the communication bandwidth needed, the transferred data can be compressed. For multi-camera video, each video could be encoded using MPEG algorithms. The three-dimension geometry could be reduced to a single bit per voxel, and could then be compressed using volumetric data structures, such as oct tree or run-length encoding.

Alternative methods for three-dimension modeling and rendering have been developed in recent years, e.g., direct three-dimension modeling and rendering, and also image-space modeling and rendering. The direct three-dimension methods estimate three-dimension structure directly from simple measurements of physical systems. The most common technique is to actively illuminate the scene with a laser, measure either the time or flight or the phase shift of the laser light reflected back to the source, convert this measurement to distance between sensor and illuminated surface, and then compute the surface's three-dimension position. The laser can then be scanned across the scene to capture many three-dimension points in the scene. These techniques are used in commercial products from K2T, Inc. (www. k2t. com) and Cyra Technologies, Inc., as well as in many custom systems. A modification of this technique is to scan a light stripe across the scene.

The other approach is to illuminate the entire scene several times and then to measure the returned light during precise intervals of time. Each illumination can yield another bit of depth resolution, so high resolution can be quickly achieved. This technology is incorporated in commercial products from 3DV Systems Ltd (www. 3dvsystems. com).

Either method yields three-dimension information, but only for the surfaces visible from the viewpoint of the sensor. Several researchers have developed algorithms to merge these results into complete three-dimension models. The methods based on volumetric integration have proven most successful. See B. Curless and M. Levoy, "A Volumetric Method For Building Complex Models From Range Images", SIGGRAPH '96, 1996. A. Hilton, A. J. Stoddart, J. Illingworth, and T. Windeatt; "Reliable Surface Reconstruction From Multiple Range Images", Proceedings of ECCV '96, pp. 117–126, April 1996; and M. Wheeler, "Automatic Modeling And Localization For Object Recognition", Ph.D. thesis, Carnegie Mellon University, 1996.

Two limitations make direct three-dimension measurement impractical. First, multiple sensors cannot coexist in the same environment because of the active scene illumination. With multiple sensors, working simultaneously, the illumination from one sensor would interfere that of others. In addition, eye safety is always an issue when using lasers around humans. Second, scanning the space with a laser means that three-dimension measurements are made at different times. Such image, then, is actually a time-sequential sampling of shape, not a snapshot as is captured with a photograph. This sensor characteristic leads to apparent shape distortions for fast-moving objects.

Image-space modeling and rendering is an alternative to explicit three-dimension model recovery. It models all possible light rays emanating from the scene. An image can be considered as a two-dimension bundle of rays from this ray space, so the rendering in this case involves selecting the best rays to produce each pixel in the output image. A surprisingly simple version of this concept is the object movie in Apple QuickTime VR. Several hundred images are captured at precise positions around the object. A viewing program then lets the user manipulate the object, which looks to the user like three-dimension rotation of the real object. In fact, the viewing program is simply selecting the closest view from its database.

More sophisticated examples actually interpolate rays from the input images to synthesize new viewpoints. The first example of this approach was first presented in Katayama's work A. Katayama, K. Tanaka, T. Oshino, and H. Tamura, "A Viewpoint Dependent Stereoscopic Display Using Interpolation Of Multi-viewpoint Images", SPIE Proc. Vol. 2409:Stereoscopic Displays and Virtual Reality Systems II , pp. 11–20,1995, which was recently extended into the light field, M. Levoy and P. Hanrahan, "Light Field Rendering", SIGGRAPH '96, August 1996. Also see "The Lumigraph", S. J. Gortler, R. Grzeszczuk, R. Szeliski, and M. F. Cohen, SIGGRAPH '96,1996. In the light field method, cameras are precisely positioned to directly sample all of the rays in the space, thereby completely filling the ray space. In the Lumigraph, an algorithm is presented to extrapolate images from a set of arbitrarily-placed cameras to fill the ray space.

SUMMARY OF THE INVENTION

The present invention is an interactive virtual telepresence system that allows an Internet user to view three-dimensional objects from any perspective in a studio at a remote server. The system includes several video cameras trained on the three-dimensional objects and a computer that calculates the depth information of the solid. The server broadcasts each camera view and depth information for each view. A user selects the viewing perspective desired, and the computer at the user's site receives the nearest camera views to the requested perspective and depth information of each of the views for the interpolation and renders the selected view.

The invention also applies to virtual viewpoints where a virtual three-dimensional model image is stored on a network server. The server uses virtual cameras that obtain a rendered image and depth information for a particular viewpoint. The server then sends the rendered image and the depth information to a user.

DETAILED DESCRIPTION OF THE INVENTION

Figure 1:
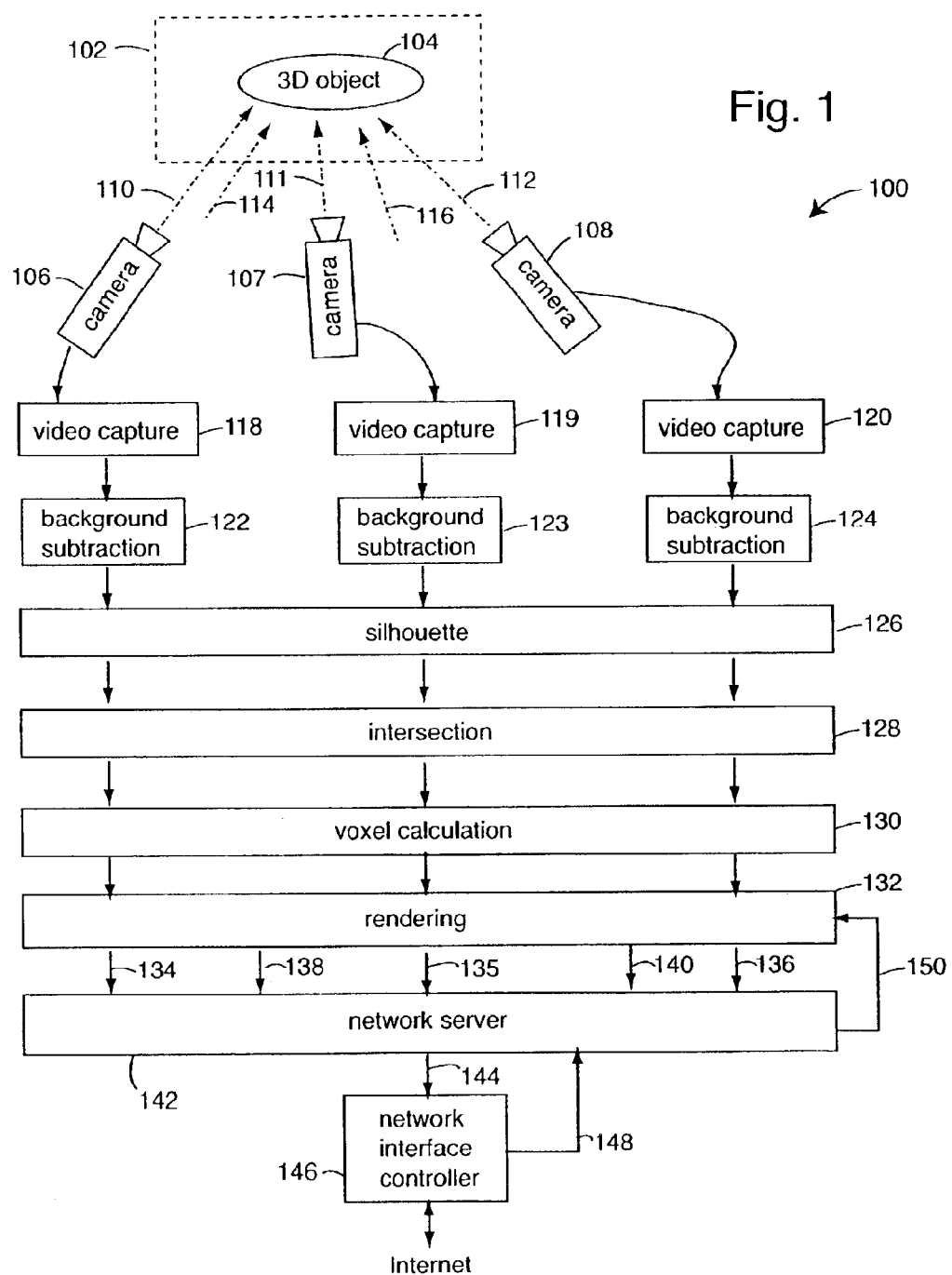
FIG. 1 is a functional block diagram of an Internet system for virtual telepresence in an embodiment of the present invention that uses immersive video in which strategically located cameras monitor a scene from different perspectives.

FIG. 1 is a functional block diagram of an Internet system for virtual telepresence, and this embodiment of the present invention is refereed to herein by the general reference numeral 100. The system 100 allows a user to be virtually present in a studio 102 in which some three-dimension object 104 or scene is on-camera. The viewpoint of the user can be from any angle the viewer chooses. If implemented well enough, the viewer has the sense that the viewer is inside the scene and can move about, e.g., to get a better look.

In general, conventional Lumigraph systems provide for digital three-dimensional imaging of objects that allows for viewing images of the object from arbitrary vantage points. See, U.S. Pat. No. 6,023,523, issued to Cohen, et al., Feb. 8, 2000, and incorporated herein by reference. And see, S. J. Gortler, et al., "The Lumigraph", Computer Graphics Proceedings, Annual Conference Series, 1996, pp. 43–54, ACM-0-89791-746-4/96/008. A complete appearance of either a synthetic or real object or a scene is collected. A representation of the appearance is used to render images of the object from any vantage point. The appearance of an object is a collection of light rays that emanate from the object in all directions. The system stores the representation of the appearance as a set of coefficients of a four-dimensional function, referred to as the Lumigraph function. From the Lumigraph function with these coefficients, the Lumigraph system can generate two-dimensional images of the object from any vantage point. The Lumigraph system generates an image by evaluating the Lumigraph function to identify the intensity values of light rays that would emanate from the object to form the image. The Lumigraph system then combines these intensity values to form the image.

But, such conventional systems used the way they were intended are impractical when the Internet is the communication intermediary. This is because the available bandwidth is so limited, and conventional systems require extraordinarily wide bandwidths to communicate all the real images in parallel and huge processor overheads for computing virtual perspectives. When these needs are multiplied by the numbers of users involved, the task becomes impossibly enormous.

The studio 102 is populated with many cameras set at different viewpoints around the object, e.g., front, left, right, top, and back. All these real viewpoints are represented by a group of cameras 106–108 and their corresponding perspective views 110–112. In practical applications, at least two cameras and perspectives will be needed. Any of a number of virtual perspectives that are not actually populated with a camera can be computed by interpolation of the real views. A pair of virtual perspectives 114 and 116 represent these novel views. Each camera has a video capture unit 118–120, respectively, that includes a frame-grabber function. Each captured video frame typically includes a background, image that surrounds object 104 that needs to be removed from the scene by a background subtractor 122–124.

A silhouette is computed from the background subtracted images by a silhouette processor 126. For details on the construction of a prior art silhouette processor see, H. Saito, S. Baba, M. Kimura, S. Vedula, and T. Kanade, "Appearance-Based Virtual View Generation Of Temporally-Varying Events From Multi-Camera Images In The Three-dimension Room", Three-dimension Digital Imaging and Modeling (3D1M'99), October 1999.

The intersections of rays created by projecting through silhouettes are computed by an intersection processor 128. For information on implementing an intersection processor 128, see, P. Lacroute, "Analysis Of A Parallel Volume Rendering System Based On The Shear-Warp Factorization", Visualization and Computer Graphics, IEEE Transactions on Volume, 23, September 1996, pp. 218–231. And see, A. Katkere, S. Moezzi, D. Y. Kuramura, and R. Jam, "Towards Video-based Immersive Environments", MultiMedia Systems, vol. 5, no. 2, pp.69–85, 1997. The output are voxels. U.S. Pat. No. 5,544,283, issued Aug. 6, 1996, to Kaufman, et al., describes methods and apparatus for real-time rendering of high resolution volumetric images. Such Patent is incorporated herein by reference.

A voxel calculation for the voxels representing object 104 are done by a voxel processor 130. For a discussion, see "A Multi-Camera Method For 3D Digitization Of Dynamic, Real-World Events", a thesis by Peter Rander, presented to Carnegie Mellon University, The Robotics Institute, copyright May 1998, CMU-RI-TR-98-12. Voxel processing depends on a series of cross-sectional images that represent a volume. Such cross-sectional digital images are a volumetric dataset. Each image or slice in a given dataset comprises picture elements (pixels). The distance between any two consecutive pixel centers in any slice within a dataset is the interpixel distance. And the distance between any two consecutive slices is the interslice distance.

The processing of a volumetric dataset begins by stacking the slices according to the interpixel and interslice distances so that the data exists in a "virtual" coordinate space which accurately reflects the real world dimensions of the originally sampled volume. Additional slices can be inserted between the dataset's original slices so that the entire volume in computer memory is represented as one solid block of data. The pixels in such block can be processed as volume pixels (voxels) such that a volume can be translated and rotated and a rendering of the dataset can be obtained. One voxel can block the view of another voxel, depending on their relative positions and the view perspective. So voxels are assigned an opacity value by an opacity transformation function. Such function provides a direct, linear relationship between voxel intensity and opacity. The higher a voxel's intensity value, the more opaque that voxel is when rendered.

The surfaces of object 104 are rendered by a rendering processor 132 for all the available viewpoints. In particular, see, P. Lacroute, "Analysis Of Parallel Volume Rendering System Based On The Shear-Warp Factorization", Visualization and Computer Graphics, IEEE Transactions on Volume, Sep. 23, 1996, pp. 218–231.

For more details to help on possible implementations, see, P. Debevec, C. Taylor, and J. Malik, "Modeling And Rendering Architecture From Photographs: A Hybrid Geometry-based And Image-based Approach", SIGGRAPH '96, 1996; and see, A. Hilton, A. J. Stoddart, J. Illingworth, and T. Windeatt, "Reliable Surface Reconstruction From Multiple Range Images", Proceedings of ECCV '96, pp.117–126, April 1996; and see, M. Levoy and P. Hanrahan, "Light Field Rendering", SIGGRAPH '96, August 1996. Requested views are synthesized or interpolated from the available real viewpoints. Depending on the novel viewpoint being synthesized, some of the real viewpoints will be more important than others. Some of the real views may have no significant contribution at all to the computed views.

The real viewpoints are output as signals 134–136 and interpolated novel viewpoints are represented by signals 138 and 140. Such interpolated novel viewpoints are produced at the express request of one or more remote users over the Internet. The interpolated images are warped or morphed from the real viewpoint images. See, S. Seitz, et al., "Physically-Valid View Synthesis By Image Interpolation", Proc. Workshop on Representations of Visual Scenes, Cambridge Mass., 1996. Another way to implement the interpolation processor 134 is described in U.S. Pat. No. 5,831,619, issued Nov. 3, 1998, to A. Nakagaw, et al., and also U.S. Pat. No. 5,613,048, issued Mar. 18, 1997, to S. Chen, et al. Such Patents are incorporated herein by reference.

A network server 142 selects only those signals 134–140, voxel, and rendering information necessary to support a particular network connection. Such may be implemented with Microsoft WINDOWS-NT, ACTIVE SERVER PAGES (ASP), and Internet Information Server (IIS). A selected signal 144 is transmitted by a network interface controller (NIC) 146. Any user information and requests are returned by a signal 148 and a portion is used to control the rendering processor 132 with a control signal 150.

Figure 2:
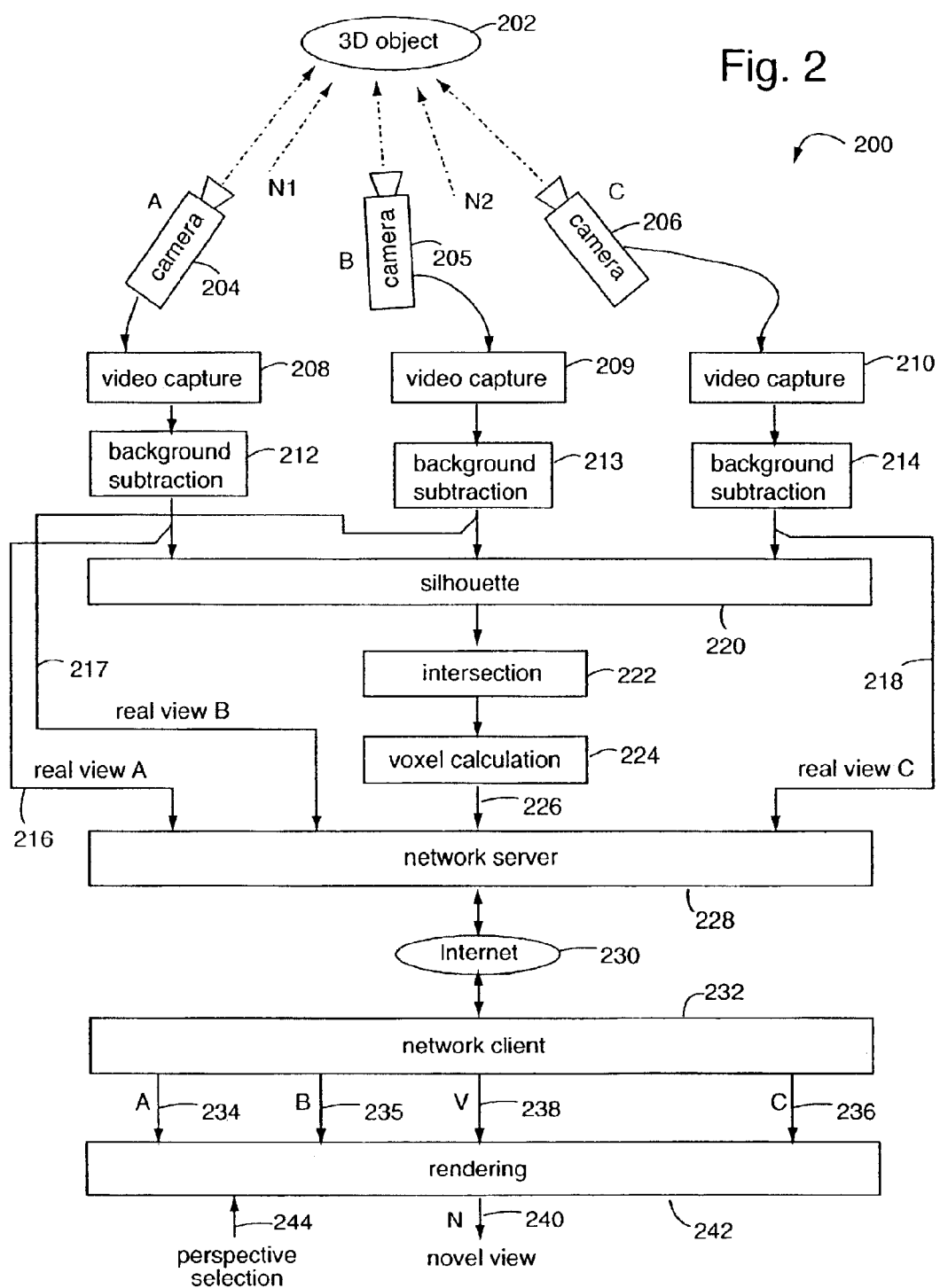
FIG. 2 is a functional block diagram of a second virtual telepresence Internet system embodiment of the present invention that computes the voxels and supplies all the video streams from every strategically located camera monitoring a scene from different perspectives.

FIG. 2 represents a system 200 that reduces the computational loads and bandwidth demands on a webserver that transmits real-time three-dimension video. System 200 images a 3D object 202 with an adequate set of cameras represented by cameras 204–206. Each captures real views A–C, and novel views N1 and N2 can be computed. Each camera is connected to a video capture device 208–210 and a background subtractor 212–214. A background-subtracted real-view (A–C) 216–218 is used by a silhouette processor 220. An intersection processor 222 computes the intersections from the silhouettes, and feeds a voxel calculator 224. The result is a voxel database 226 that is supplied to a network server 228 along with background-subtracted real-views (A–C) 216–218 for the Internet 230. All the background-subtracted real-views and the voxel calculation are supplied to a network client 232 on demand, e.g., as represented by views A–C 234–236 and a voxel database 238. A novel view (N) 240 is interpolated from the available information by a renderor 242 in response to a perspective selection 244 provided by a user.

In effect, system 200 distributes the rendering task to each network client. In some applications there could be thousands of independent network clients 232 all asking for the same data from a single network server 228. Each client could be asking for a unique perspective selection 244 provided by its respective user, so this architecture avoids rendering bottlenecks.

Figure 3:
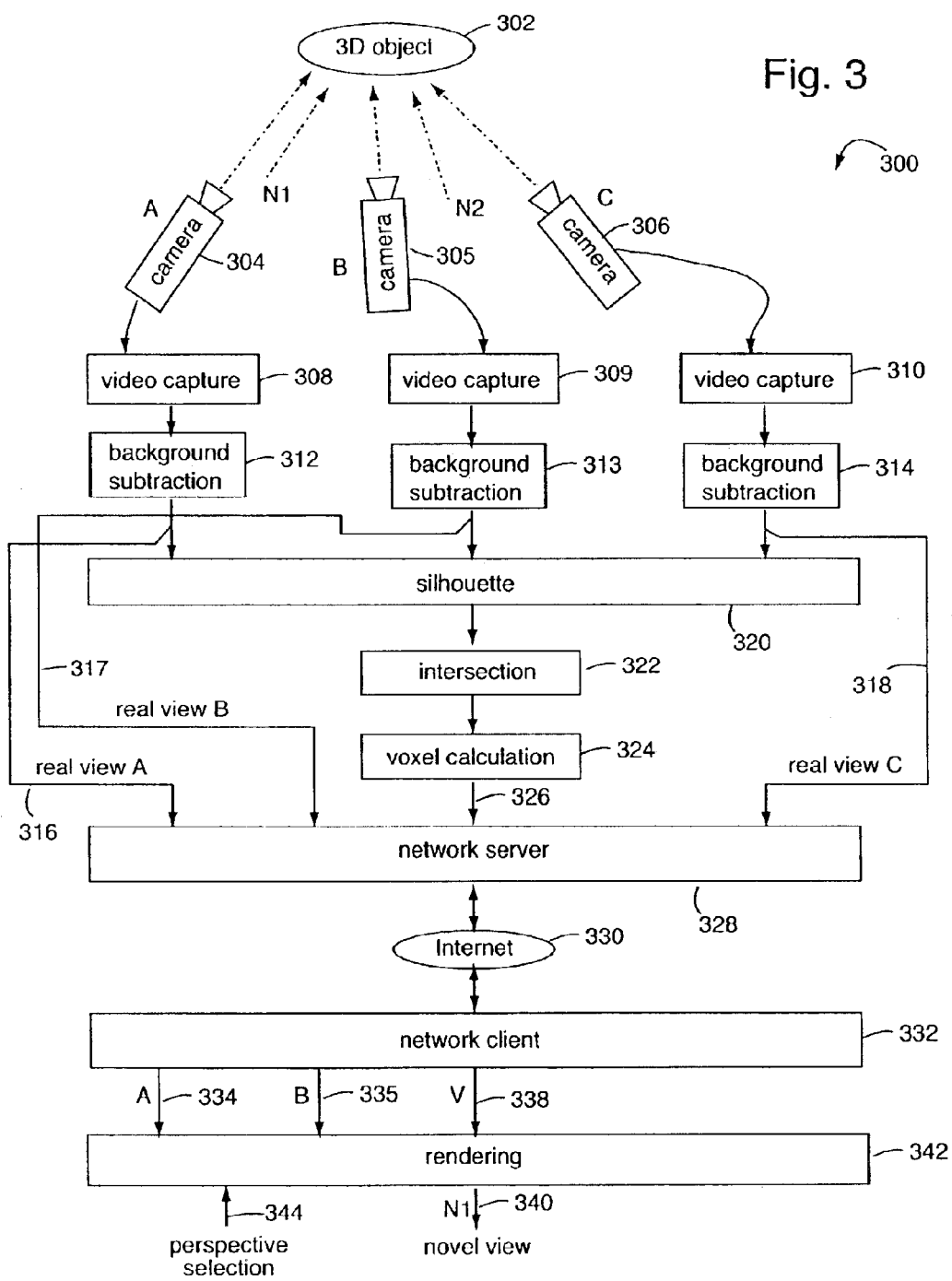
FIG. 3 is a functional block diagram of a third virtual telepresence Internet system embodiment of the present invention that computes the voxels and supplies two or three of the video streams from the more usefully located cameras monitoring a scene from different perspectives, the two or three video perspectives supplied are those closest to a novel perspective selection divulged by the user.

FIG. 3 represents another system embodiment of the present invention that reduces the computational loads and bandwidth demands on a webserver that transmits real-time 3D video, and is referred to herein by the general reference numeral 300. System 300 images a three-dimension object 302 with an adequate set of cameras represented by cameras 304–306. Each captures real views A–C, and novel views N1 and N2 can be computed by Internet clients at their remote sites and with their respective platforms. Each camera is connected to a video capture device 308–310 and a background subtractor 312–314. A background-subtracted real-view (A–C) 316–318 is used by a silhouette processor 320. An intersection processor 322 computes the intersections from the silhouettes, and feeds a voxel calculator 324. The result is a voxel database 326 that is supplied to a network server 328 along with background-subtracted real-views (A–C) 316–318 for the Internet 330. The voxel calculation and only selected background-subtracted real-views are supplied to each unique network client 332 on demand. For example, FIG. 3 represents the selection of real views A 334 and B 335. The elimination of the unnecessary views (e.g., view C) reduces the communication load, and therefore the bandwidth demands are not as great. A voxel database 338 must be included for rendering.

A novel view (N1) 340 is interpolated from the available information by a renderor 342 in response to a perspective selection 344 provided by a user. Such novel view N1 depends more on real views A and B and could be reasonably computed without real view C. However, another network client and corresponding user could select a perspective that needs real views B and C to produce a novel view N2, for example.

System 300 also distributes the rendering task to each network client. It further reduces the amount of data that must be transferred over the Internet in real time by not communicating those real views that are not needed by particular network clients and users.

In alternative embodiments of the present invention, the communication of voxel information takes advantage of data compression and decompression techniques. For example, it is only occasionally necessary to send a complete voxel database description. In the interim, only those voxels that have changed since the last frame need to be identified. The decompression can keep a running model updated with such change information. Such compression can be included in network servers 228 and 328, and the corresponding decompression in network clients 232 and 332.

Figure 4:
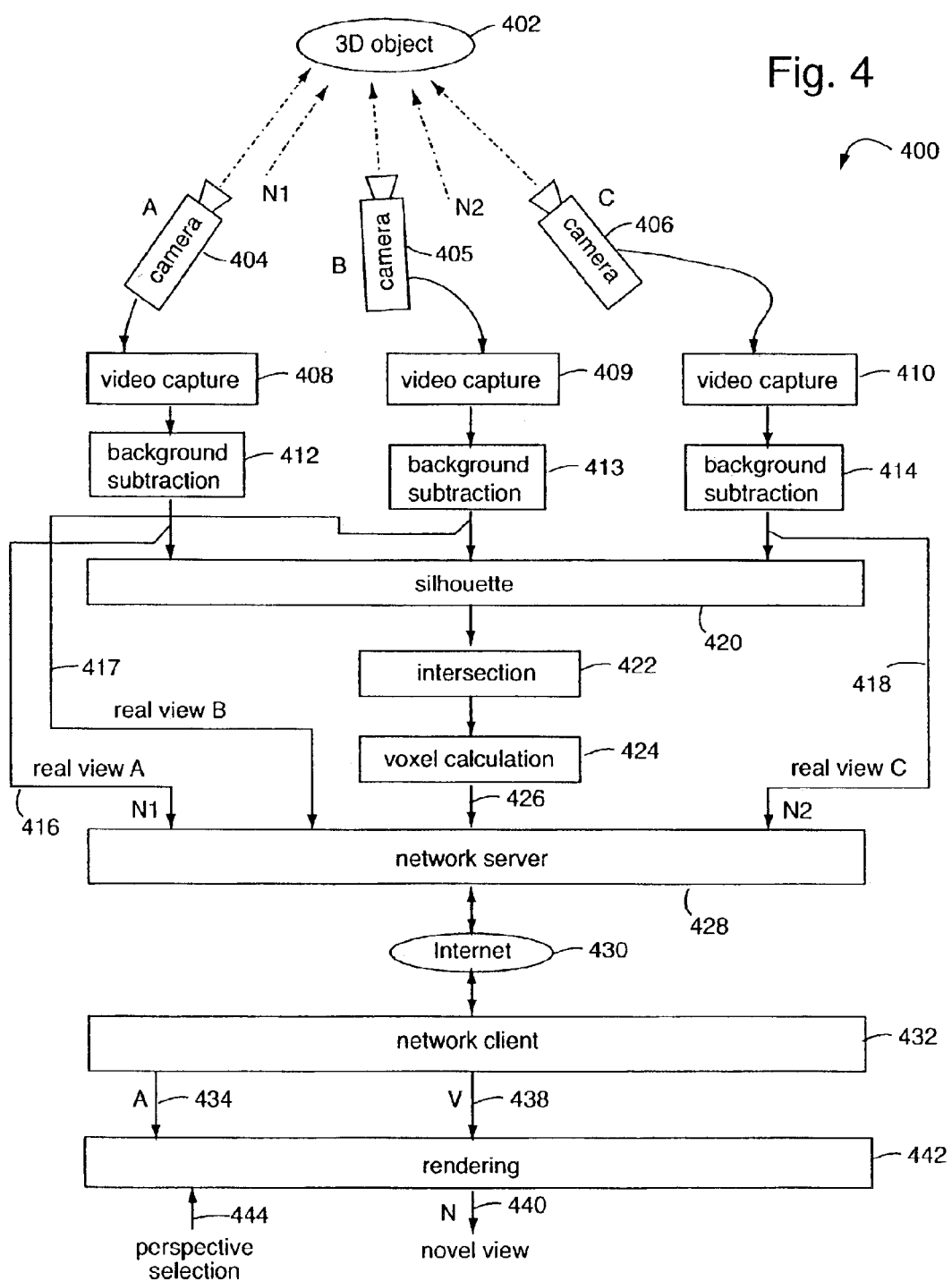
FIG. 4 is a functional block diagram of a fourth virtual telepresence Internet system embodiment of the present invention that computes the voxels and supplies one of the video streams from the most usefully located camera monitoring a scene from different perspectives, such video perspective supplied is the one closest to a novel perspective selection divulged by the user.

FIG. 4 represents a further telepresence system embodiment of the present invention, and is referred to herein by the general reference numeral 400. System 400 images a three-dimension object 402 with an adequate set of cameras represented by cameras 404–406. Each captures real views A–C, and novel views N1 and N2 are computed by network server 428. Each camera is connected to a video capture device 408–410 and a background subtractor 412–414. A background-subtracted real-view (A–C) 416–418 is used by a silhouette processor 420. An intersection processor 422 computes the intersections from the silhouettes, and feeds a voxel calculator 424. The result is a voxel database 426 that is supplied to a network server 428 along with background-subtracted real-views (A–C) 416–418 for the Internet 430. Intermediate views N1, N2 are computed by the network server 428, so that novel view computation at the network client is smooth. The voxel calculation and only one background-subtracted real-view or intermediate view are supplied to each unique network client 432 on demand. For example, FIG. 4 represents the selection of real view A 434 and a voxel database 438. The elimination of all the other views (e.g., views B and C and N1 and N2) further reduces the communication load, and the bandwidth demands are quite modest.

A novel view (N) 440 is interpolated from the available information by a renderor 442 in response to a perspective selection 444 provided by a user. Such novel view N depends more on real view A and could be satisfactorily computed without real views B and C. However, another network client and corresponding user could select a perspective that needs real views B or C to produce another novel view.

System 400 distributes the rendering task to each network client. It further reduces the amount of data that must be transferred over the Internet in real time by communicating only the one real view or intermediate view closest to the novel view needed by particular network clients and users.

Figure 5:
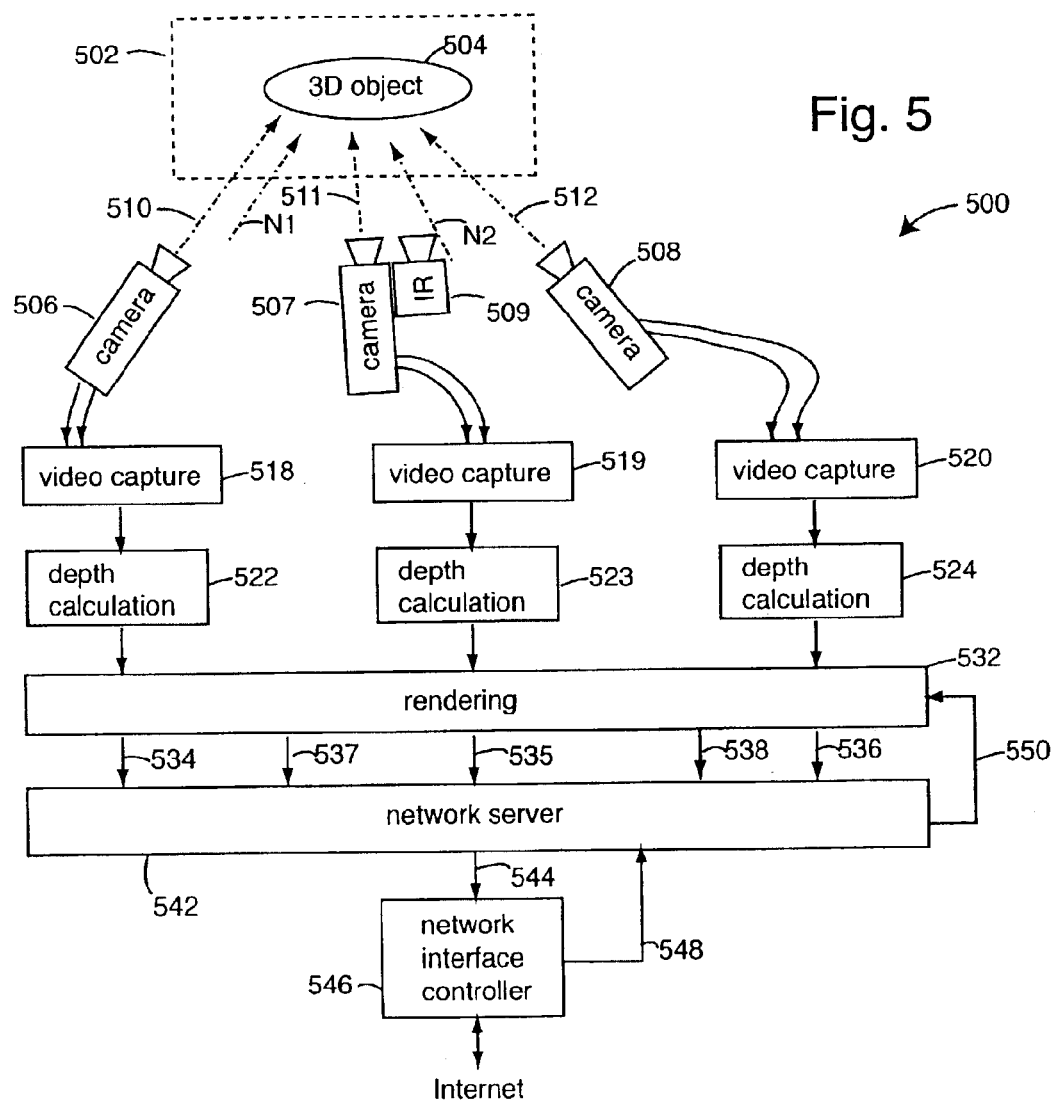
FIG. 5 is a functional block diagram of a fifth virtual telepresence in an embodiment of the present invention that computes depth information and supplies rendered video streams from every strategically located camera monitoring a scene from different perspectives.

FIG. 5 represents another telepresence system embodiment of the present invention. Instead of using a voxel database as described above, a depth calculation is used in the system 500 to deliver rendered three-dimensional viewpoints to a user. System 500 images a 3D object 502 with an adequate set of cameras represented by cameras 506–508. Each captures real views A–C 510–512, and novel views N1 and N2 can be computed. Each camera is connected to a video capture device 518–520 and a depth calculator 522–524.

Depth information is calculated for each camera location by depth calculators 522–524. A silhouette is an example of depth information. The most degenerate case is when the foreground object is at a constant distance and the background object is at infinity. The result will be a bi-value depth information, which is a silhouette. Background subtraction is also an example of depth calculation.

If there is at least one image of a picture and the depth image for that picture, then there is enough information for obtaining any viewpoint. This is typically good for obtaining a novel viewpoint within, for example, 30 degrees from the original camera viewpoint. The silhouette is one instance. This approach has not been used for broadcasting. When broadcasting, video will be compressed using lossy compression such as MPEG-2 and depth information can be compressed using MPEG-2.

A mechanism is added to measure depth information. There are various ways of obtaining depth information. One example uses infrared. An infrared camera is placed next to or collocated with each image capture camera 506–508 (in this example they are collocated). An infrared pattern from an infrared source 509 is projected onto the image 504 being observed. The infrared pattern does not have any effect on the image capture portion of the camera. The infrared camera 506–508 captures the projected infrared pattern on the image 504. Depth calculation modules 522–524 examine the captured pattern for each camera. For example, a projected pattern on an image will have a smaller pattern on areas of the image that are closer and a larger pattern on areas of the image that are further away from the infrared source.

Another way of using an infrared pattern is through triangulation. With several infrared cameras observing the infrared pattern, depth can be calculated by measuring the view angle of the pattern from each of the infrared cameras and triangulating the depth from the angle measurements.

Infrared is the least expensive and most accurate approach for depth calculation.

As mentioned above, another approach to measuring depth is to use X-rays. One company (3DV Systems, Inc., www.3dvsystems.com) uses an approach for 3D object masking that pulses an X-ray beam at the subject and measures the reflection delay to calculate depth information. This approach only works for one camera because it measures the reflection delay of the pulse. Only one X-ray pulse source can be in an area at a time. More than one X-ray pulse source will confuse the reflection sensors.

Pattern projection using some method, such as infrared projection, is known as "structured lights."

Each camera 506–508 sends an image signal and an infrared pattern capture signal to a video capture device 518–520. Depth calculators 522–524 examine the captured infrared pattern and calculate depth information for the particular camera viewpoint. The surfaces of object 504 are rendered by a rendering processor 532 for all of the requested views. Requested views are synthesized or interpolated from the available real views. Depending on the novel view being synthesized, some of the real views will be more important than others. Some of the real views may have no significant contribution at all to the computed views.

The real views are output as signals 534–536 and interpolated novel views are represented by signals 537 and 538. Such interpolated novel views are produced at the express request of one or more remote users over the Internet. The interpolated images are warped or morphed from the real viewpoint images.

A network server 542 selects only those signals 534–538 necessary to support a particular network connection as described above. A selected signal 544 is transmitted by a network interface controller (NIC) 546. Any user information and requests are returned by a signal 548 and a portion is used to control the rendering processor 532 with a control signal 550.

Figure 6:
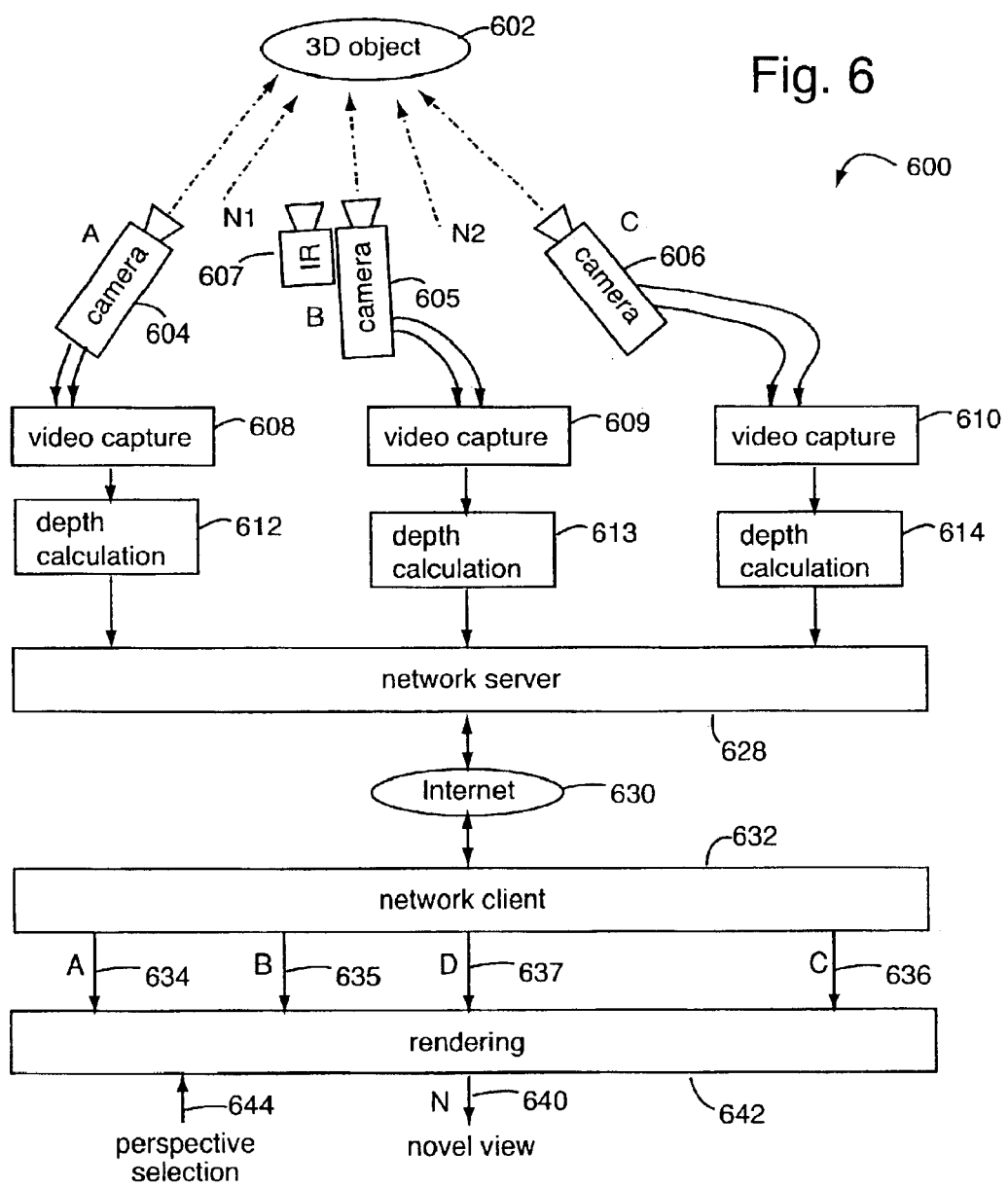
FIG. 6 is a functional block diagram of a sixth virtual telepresence Internet system embodiment of the present invention that computes depth information and supplies all the video streams and depth information from every strategically located camera monitoring a scene from different perspectives.

FIG. 6 represents yet another telepresence system embodiment of the present invention. System 600 images a 3D object 602 with an adequate set of cameras represented by cameras 604–606. Each captures real views A–C, and novel views N1 and N2 can be computed. Each camera is connected to a video capture device 608–610 and a depth calculator 612–614. An infrared camera is collocated with each image capture camera 604–606 in this example. An infrared pattern from an infrared source 607 is projected onto the image 602 being observed. The infrared camera 604–606 captures the projected infrared pattern on the image 602.

Depth calculation modules 612–614 examine the captured pattern for each camera. Each camera 604–606 sends an image signal and an infrared pattern capture signal to a video capture device 608–610. Depth calculators 612–614 examine the captured infrared pattern and calculate depth information for the particular camera viewpoint. Image views and depth information for each viewpoint are supplied to a network server 628 for the Internet 630. All the image views and the associated depth information are supplied to a network client 632 on demand, e.g., as represented by views A–C 634–636 and depth information 637. A novel view (N) 640 is interpolated from the available information by a rendering module 642 in response to a perspective selection 644 provided by a user.

In effect, system 600 distributes the rendering task to each network client. In some applications there could be thousands of independent network clients 632 all asking for the same data from a single network server 628. Each client could be asking for a unique perspective selection 644 provided by its respective user, so this architecture avoids network and rendering bottlenecks.

Figure 7:
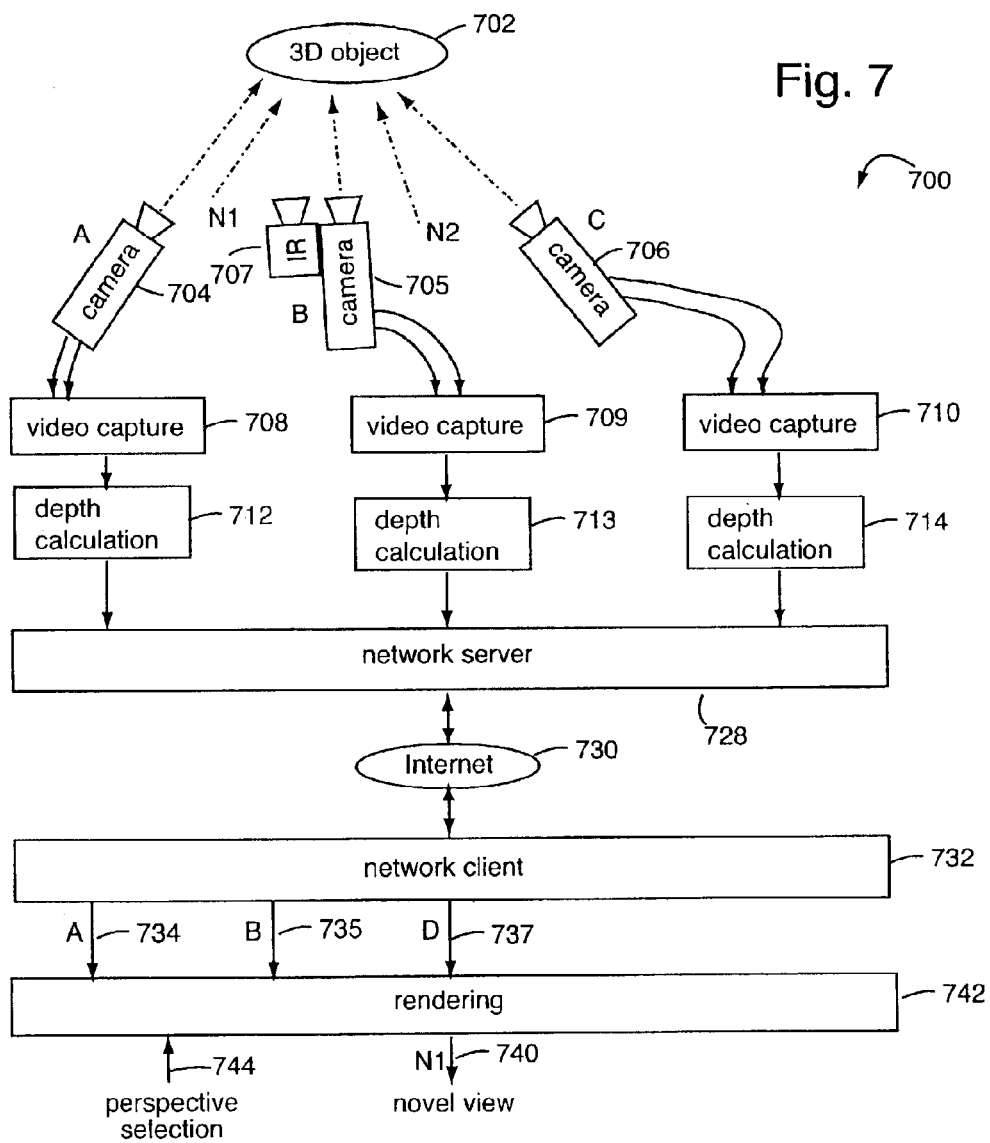
FIG. 7 is a functional block diagram of a seventh virtual telepresence Internet system embodiment of the present invention that computes depth information and supplies two or three of the video streams and depth information from the more usefully located cameras monitoring a scene from different perspectives, the two or three video perspectives supplied are those closest to a novel perspective selection divulged by the user.

FIG. 7 represents a further telepresence system embodiment of the present invention. System 700 images a three-dimension object 702 with an adequate set of cameras represented by cameras 704–706. Each captures real views A–C, and novel views N1 and N2 can be computed by Internet clients at their remote sites and with their respective platforms. Each camera is connected to a video capture device 708–710 and a depth calculator 712–714. An infrared camera is collocated with each image capture camera 704–706 in this example. An infrared pattern from an infrared source 707 is projected onto the image 702 being observed. The infrared camera 704–706 captures the projected infrared pattern on the image 702.

Depth calculation modules 712–714 examine the captured pattern for each camera. Each camera 704–706 sends an image signal and an infrared pattern capture signal to a video capture device 708–710. Depth calculators 712–714 examine the captured infrared pattern and calculate depth information for the particular camera viewpoint. Image views and depth information for each viewpoint are supplied to a network server 728 for the Internet 730. Only selected real-views and their associated depth information are supplied to each unique network client 732 on demand. For example, FIG. 7 represents the selection of real views A 734 and B 735. The elimination of the unnecessary views (e.g., view C) reduces the communication load, and therefore the bandwidth demands are not as great. Depth information 737 for each view must be included for rendering.

A novel view (N1) 740 is interpolated from the available information by a renderor 742 in response to a perspective selection 744 provided by a user. Such novel view N1 depends more on real views A and B and could be reasonably computed without real view C. However, another network client and corresponding user could select a perspective that needs real views B and C to produce a novel view N2, for example.

System 700 also distributes the rendering task to each network client. It further reduces the amount of data that must be transferred over the Internet in real time by not communicating those real views that are not needed by particular network clients and users.

As above, in alternative embodiments of the present invention, the communication of depth information takes advantage of data compression and decompression techniques used in the industry such as MPEG-4. Such compression can be included in network servers 628 and 728, and the corresponding decompression in network clients 632 and 732.

Figure 8:
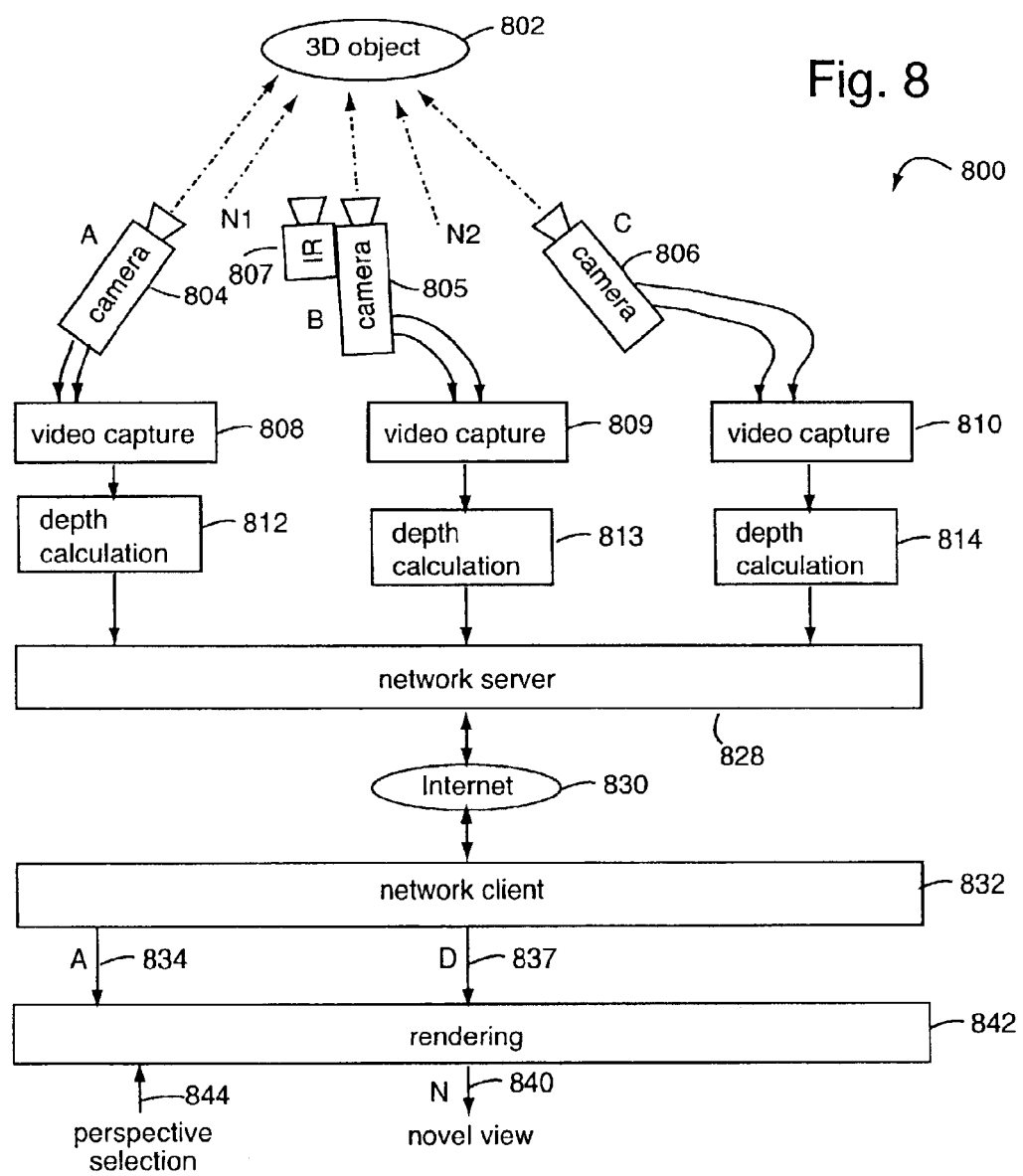
FIG. 8 is a functional block diagram of an eighth virtual telepresence Internet system embodiment of the present invention that computes depth information and supplies one of the video streams and its depth information from the most usefully located camera monitoring a scene from different perspectives, such video perspective supplied is the one closest to a novel perspective selection divulged by the user.

FIG. 8 represents another telepresence system embodiment of the present invention, and is referred to herein by the general reference numeral 800. System 800 images a three-dimension object 802 with an adequate set of cameras represented by cameras 804–806. Each captures real views A–C, and novel views N1 and N2 are computed by network server 828. Each camera is connected to a video capture device 808–810 and a depth calculator 812–814. An infrared camera is collocated with each image capture camera 804–806 in this example. An infrared pattern from an infrared source 807 is projected onto the image 802 being observed. The infrared camera 804–806 captures the projected infrared pattern on the image 802. Depth calculation modules 812–814 examine the captured pattern for each camera. Each camera 804–806 sends an image signal and an infrared pattern capture signal to a video capture device 808–810.

Depth calculators 812–814 examine the captured infrared pattern and calculate depth information for the particular camera viewpoint. Image views and depth information for each viewpoint are supplied to a network server 828 for the Internet 830. Intermediate views N1, N2 are computed by the network server 828, so that novel view computation at the network client is smooth. Only one real-view and depth information for the view are supplied to each unique network client 832 on demand. For example, FIG. 8 represents the selection of real view A 834 and a depth information 837. The elimination of all the other views (e.g., views B and C and N1 and N2) further reduces the communication load, and the bandwidth demands are quite modest.

A novel view (N) 840 is interpolated from the available information by a renderor 842 in response to a perspective selection 844 provided by a user. Such novel view N depends more on real view A and could be satisfactorily computed without real views B and C. However, another network client and corresponding user could select a perspective that needs real views B or C to produce another novel view.

System 800 distributes the rendering task to each network client. It further reduces the amount of data that must be transferred over the Internet in real time by communicating only the one real view or intermediate view closest to the novel view needed by particular network clients and users. Compression of video and depth information can be applied in this system as in 700 and 800.

The invention's depth calculation approach can also be applied to virtual views where a virtual three-dimensional model image is stored on a network server. The server uses virtual cameras that obtain a rendered image and depth information for a particular viewpoint. The server then sends the rendered image and the depth information to a user.

The user can view the image using viewing software on his computer. He can rotate the three-dimensional image through the virtual camera views. The user obtains a stereoscopic view of the image from one image view and one depth map. This is compared to the current approach which sends a left and right eye view of the image to obtain a stereoscopic view.

The server can also send all of the depth information and all of the virtual viewpoints to a user for still images, thus allowing the user to freely navigate through the image's views.

Although the invention is preferably described herein with reference to the preferred embodiment, one skilled in the art will readily appreciate that other applications may be substituted for those set forth herein without departing from the spirit and scope of the present invention. Accordingly, the invention should only be limited by the claims included below.

What is claimed is:

1. An Internet system for virtual telepresence, comprising:
   a plurality of video cameras for monitoring a scene, and wherein each provides a respective real-perspective video stream from a unique viewpoint;
   a depth calculation processor connected to each of the plurality of video cameras, and for providing a calculation of depth information for each video camera; and
   a network server connected to receive each said respective real-perspective video stream from the plurality of video cameras, and connected to receive said depth information from the depth calculation processor;
   wherein a particular rendering of a novel perspective is left to be done by a network client and an information transfer for such is provided by the network server.

2. The system of claim 1, further comprising:
   a network client that can be provided with a novel perspective selection by a user, and that provides for a transmission of information to the network server to send less than all said respective real-perspective video streams and associated depth information from the plurality of video cameras.

3. The system of claim 2, wherein the network client is provided with a novel perspective selection N that is forwarded over the Internet to the network server, and wherein the network server is such that it responds to the particular network client with only those respective real-perspective video streams from the plurality of video cameras and associated depth information that are needed to render said novel perspective selection N.

4. The system of claim 2, wherein the network client is provided with a novel perspective selection N that is forwarded over the Internet to the network server, and wherein the network server is such that it responds to the particular network client with only a single real-perspective video stream from the plurality of video cameras and associated depth information that can best be used to render a viewpoint represented by said novel perspective selection N.

5. The system of claim 2, further comprising:
   a renderor connected to the network client for generating a viewpoint represented by said novel perspective selection.

6. The system of claim 1, further comprising:
   a plurality of video capture devices each respectively associated with the plurality of video cameras, and providing for said real-perspective video streams.

7. The system of claim 1, further comprising:
   a plurality of infrared video cameras for placed near or collocated with each video camera used for monitoring a scene;
   wherein each infrared video camera captures a pattern projected onto said scene by an infrared source; and
   wherein said depth calculation processor analyzes each captured pattern by measuring pattern size on areas of said scene to calculate depth information.

8. The system of claim 1, further comprising:
   a plurality of infrared video cameras for placed near or collocated with each video camera used for monitoring a scene;
   wherein each infrared video camera captures a pattern projected onto said scene by an infrared source; and
   wherein said depth calculation processor triangulates captured patterns on areas of said scene to calculate depth information.

9. The system of claim 1, further comprising:
   a data compressor providing for a lossy compression of said video streams to reduce network bandwidth requirements.

10. A virtual telepresence system for use on the Internet, comprising:
    a plurality of video cameras for monitoring a scene, and wherein each provides a respective real-perspective video stream from a unique viewpoint;
    a depth calculation processor connected to each of the plurality of video cameras, and for providing a calculation of depth information for each video camera; and
    a network server connected to receive each said respective real-perspective video stream from the plurality of video cameras, and connected to receive said depth information from the volume-element processor, and is such that it responds to the particular network client with only those respective real-perspective video streams from the plurality of video cameras and associated depth information that are needed to render said novel perspective selection N, and such that it responds to the particular network client with only a single real-perspective video stream from the plurality of video cameras that can best be used to render a viewpoint represented by said novel perspective selection N;
    a network client that can be provided with a novel perspective selection by a user, and that provides for a transmission of information to the network server to send less than all said respective real-perspective video streams from the plurality of video cameras and associated depth information, and is provided with a novel perspective selection N that is forwarded over the Internet to the network server, and is provided with a novel perspective selection N that is forwarded over the Internet to the network server;
    a renderor connected to the network client for generating a viewpoint represented by said novel perspective selection;
    a data compressor included in the network client for transmitting said depth information over the Internet; and
    a matching data decompressor included in the network server for receiving said depth information over the Internet;
    wherein, a particular rendering of a novel perspective is left to be done by the network client and an information transfer for such is provided by the network server in response to a request.

11. A method for communicating 3D imaging information over the Internet, the method comprising the steps of:
    capturing several video streams in parallel from a plurality of strategically placed cameras around a scene;
    calculating depth information for each video camera; and
    transmitting at least one of said several video streams and associated depth information over the Internet from a network server; and rendering a novel perspective at a network client from a reception of at least one of said several video streams and associated depth information.

12. The method of claim 11, further comprising the steps of:

accepting a user selection of a novel perspective at said network client;

communicating said novel-perspective user selection to said network server; and eliminating a transmission of one or more of said several video streams and associated depth information from transmission over the Internet by said network server to a particular network client associated with said novel-perspective user selection.

13. The method of claim 11, further comprising the step of:

compressing said video streams with a lossy compressor to reduce the bandwidth requirements of a network.

14. A method for communicating 3D imaging information over the Internet, the method comprising the steps of:

capturing several video streams in parallel from a plurality of strategically placed cameras around a scene;

calculating depth information for each video camera; and compressing each of said depth information;

transmitting at least one of said several video streams and associated compressed depth information over the Internet from a network server;

decompressing at a network client said associated compressed depth information;

rendering a novel perspective at said network client from a reception of at least one of said several video streams and associated decompressed depth information;

accepting a user selection of a novel perspective at said network client;

communicating said novel-perspective user selection to said network server; and eliminating a transmission of one or more of said several video streams and associated depth information from transmission over the Internet by said network server to a particular network client associated with said novel-perspective user selection.

15. A method for communicating 3D imaging information over the Internet, the method comprising the steps of:

providing a plurality of virtual viewpoints for monitoring a virtual three-dimensional model image stored on a server, and wherein each virtual viewpoint provides a respective real-perspective video stream from a unique viewpoint;

calculating depth information for each of the plurality of video viewpoints; and providing a network server connected to receive each said respective real-perspective video stream from the plurality of virtual viewpoints, and connected to receive said depth information for each of the plurality of video viewpoints;

wherein a particular rendering of a novel perspective is left to be done by a network client and an information transfer for such is provided by the network server.

16. The method of claim 15, further comprising the step of:

providing a network client that can be provided with a novel perspective selection by a user, and that provides for a transmission of information to the network server to send less than all said respective real-perspective video streams from the plurality of virtual viewpoints and associated depth information.

17. The method of claim 16, wherein the network client is provided with a novel perspective selection N that is forwarded over the Internet to the network server, and wherein the network server is such that it responds to the particular network client with only those respective real-perspective video streams from the plurality of virtual viewpoints and associated depth information that are needed to render said novel perspective selection N.

18. The method of claim 16, wherein the network client is provided with a novel perspective selection N that is forwarded over the Internet to the network server, and wherein the network server is such that it responds to the particular network client with only a single real-perspective video stream from the plurality of virtual viewpoints and associated depth information that can best be used to render a viewpoint represented by said novel perspective selection N.

19. The method of claim 16, further comprising the step of:

providing a renderor connected to the network client for generating a viewpoint represented by said novel perspective selection.

20. The method of claim 15, further comprising the step of:

providing a data compressor providing for a lossy compression of said video streams to reduce network bandwidth requirements.

* * * * *